United States Patent [19]

Miyazaki et al.

[11] Patent Number: 4,883,502
[45] Date of Patent: Nov. 28, 1989

[54] ABRASIVE COMPOSITION AND PROCESS FOR POLISHING

[75] Inventors: Kunihiro Miyazaki; Ken Ishitobi, both of Shiojiri, Japan

[73] Assignee: Showa Denko Kabushiki Kaisha, Tokyo, Japan

[21] Appl. No.: 255,897

[22] Filed: Oct. 11, 1988

[30] Foreign Application Priority Data

Oct. 9, 1987 [JP] Japan .................. 62-253591

[51] Int. Cl.$^4$ .................. B24D 3/02
[52] U.S. Cl. .................. 51/309; 51/293; 106/3
[58] Field of Search .................. 51/293, 309; 106/3

[56] References Cited

U.S. PATENT DOCUMENTS 4,451,269  5/1984  Makedanski et al. .................. 51/309
4,645,561  2/1987  Rea .................. 51/309
4,705,566 11/1987  Senda et al. .................. 51/309

FOREIGN PATENT DOCUMENTS 61-278587 12/1986 Japan .
62-25187   2/1987 Japan .

Primary Examiner—Paul Lieberman
Assistant Examiner—Willie J. Thompson
Attorney, Agent, or Firm—Sughrue, Mion, Zinn, Macpeak & Seas

[57] ABSTRACT

An abrasive composition comprising: an aluminous abrasive, preferably having an average particle size of 0.5–10 μm and a concentration of 1 to 25% by weight; nickel sulfamate, preferably having a concentration of 0.5 to 10% by weight; and water, the composition preferably having a pH of 4 to 7. This abrasive composition produces a superior effect when used for polishing an aluminum-based substrate for a magnetic recording disc.

12 Claims, No Drawings

ABRASIVE COMPOSITION AND PROCESS FOR POLISHING

BACKGROUND OF THE INVENTION

1. The present invention relates to an abrasive composition. More particularly, the present invention relates to an abrasive composition for rapidly polishing or providing a mirror finish to an aluminum-based substrate for a magnetic recording disc, and a process therefor.

2. Description of the Related Art

A magnetic recording disc comprises an aluminum-based substrate including an aluminum or aluminum alloy (referred to only as aluminum hereafter) disc, a nickel substrate formed by plating nickel-phosphine onto an aluminum disc, and an anodized aluminum substrate formed by anodizing an aluminum disc. A magnetic film is applied to the aluminum-based substrate by coating, plating or sputtering, and the surface of the aluminum-based substrate is provided with a mirror-finish by polishing or lapping.

A known abrasive composition used for polishing an aluminum substrate for a magnetic recording disc is a slurry which is a mixture of an aluminum abrasive and an aqueous solution of a basic or alukaline etchant. For example, H. Kitano et al., in Japanese Unexamined Patent Publication (Kokai) No. 61-278587, published on Dec. 9, 1986, disclose an abrasive composition comprising an aluminous abrasive, nickel sulfate, and water and T. Senda et al., in Japanese Unexamined Patent Publication (Kokai) No. 62-25187, published on Feb. 3, 1987 disclose an abrasive composition comprising an alumina substrate, water, and nickel or aluminum nitride, or a combination of nickel nitride or sulfate with aluminum nitride.

Due to recent demands for a denser recording on a magnetic recording disc, the aluminum-based substrate must have a finer polished surface with fewer pits, protrusions and scratches. Further, due to the recent remarkable fall in the price of a magnetic recording disc, a high polishing efficiency is necessary to reduce the working or processing cost, which is a relatively large factor in the cost of producing a magnetic recording disc. Known weak acid-based abrasive compositions, however, cannot meet these requirements, and strong acid-based abrasive ,compositions have a high polishing efficiency but are limited in use because of the accompanying problem of the disposal treatment of a strong acid radical such as nitric acid radical.

The main object of the present invention is to meet the above requirements and to provide an abrasive composition able to provide an aluminum-based substrate with a very fine finished surface at a high efficiency.

SUMMARY OF THE INVENTION

The inventors carried out various experiments in an attempt to realize the above object, with weak acids or compounds in combination with an aluminous abrasive, and found that nickel sulfamate has a remarkably high abrasion acceleration, and as a result, arrived at the present invention.

According to the present invention, there is provided an abrasive composition, particularly suitable for polishing an aluminum-based substrate for a magnetic recording disc, which comprises an aluminous abrasive, nickel sulfamate, and water. Also, a process for polishing a workpiece, particularly an aluminum-based substrate for a magnetic recording disc, with the above abrasive composition is provided.

DESCRIPTION OF THE PREFERRED EMBODIMENTS

The aluminous abrasive used in this intention is known and commercially available, and includes $\alpha$-aluminum oxide ($\alpha$-$Al_2O_3$), prepared, for example, by calcining particulate boemite [$Al_2O_3 \cdot H_2O$, $AlO(OH)$] and crushing the resultant $\alpha$-$Al_2O_3$. The aluminous abrasive preferably has an average particle size of 0.5–10 $\mu$m, more preferably 0.8–4 $\mu$m. If the average particle size of the abrasive is lower than 0.5 $\mu$m, the abrasion efficiency is lowered, and if the average particle size of the abrasive is larger than 10 $\mu$m, the finished surface of the substrate is rough. The aluminous abrasive is preferably present in an amount of 1–25% by weight, more preferably 5–10% by weight, of the total weight of the abrasive composition. If the amount of the abrasive is less than 1% by weight, the abrasion efficiency is lowered and scratches appear, and if the amount of the abrasive is more than 25% by weight, the abrasion efficiency is not increased since the workability is reduced due to an increased viscosity of the composition.

The nickel sulfamate used is represented by the molecular formula $Ni(NH_2SO_3)_2 \cdot 4H_2O$, and is preferably added in an amount of 0.5–10% by weight, more preferably 1–5% by weight, of the total weight of the abrasive composition. More than 0.5% by weight of the nickel sulfamate is necessary to obtain an effective increase of the abrasion efficiency and reduce scratches, but more than 10% by weight of the nickel sulfamate generally does not further increase the abrasion efficiency, and thus is a waste of the material.

Preferably, the abrasive composition has a pH of from 4 to 7, i.e., a weak acidity to a neutral state. If necessary, sulfamic acid, etc., may be added to the composition to obtain a desired pH, or for other purposes.

The abrasive composition according to the present invention can be thickly concentrated, as this is advantageous for storage and transportation, and even necessary for specific usages. For example, a thick composition containing 15–25 wt % of aluminous abrasive is preferable for production or storage. Such a thick composition can be used for polishing either without dilution or when diluted with about 1 to 5 times the equivalent amount of water.

The abrasive composition may be prepared, for example, by adding and mixing nickel sulfamate to an aqueous slurry of an aluminous abrasive.

The abrasive composition of the present invention is particularly suitable for polishing an aluminum-based substrate for a magnetic recording disc. Such an aluminum-based substrate includes, for example, (1) an aluminum or aluminum-alloy substrate (referred to only as "aluminum substrate" hereafter), (2) an aluminum substrate plated with nickel-phosphine or nickel-boron, e.g., by electroless plating, (3) an anodized aluminum substrate, and (4) an aluminum substrate treated with a chromate. A magnetic layer is applied to these aluminum-based substrates by coating, plating, or sputtering, etc.

Other materials which can be polished with the abrasive composition of the present invention include metals other than aluminum, synthetic resins.

The substrate may be polished with the abrasive composition by a conventional technique.

The abrasive composition according to the present invention provides a workpiece with a finer finished surface having far fewer scratches and an insignificant surface roughness, at a higher efficiency. The abrasion composition has a further advantage in that is less corrosive to machinery and less harmful to the human body.

The invention is further described by way of examples. In the Examples, the polishing characteristics of the abrasive compositions were determined by the following polishing test.

Namely, the polishing was conducted by using a four-way both-side polishing machine having surface plates 640 mm in diameter. Suede-type pads (Showa Polishing System K.K. SPD No. 4235) were attached to the surface plates, and ten (10) aluminum-based discs having 20 μm thick nickel-phosphine plated layers on both sides thereof and having a diameter of 3.5 inches were mounted on the polishing machine and polished for 6 minutes. The polishing conditions were a rotation speed of the lower surface plate of 70 rpm, a working pressure of 100 g/cm$^2$, and a slurry supply of 100 ml/min. After polishing, the aluminum-based disc was weighed and the polishing rate was determined from the loss in weight of the disc. The surface of the disc was observed by a differential interference microscope and a 100,000 lux spot light and the degree of scratching, etc., was determined. The surface roughness was measured by a Talystep and Talydata 2000 model manufactured by Rank Taylor Hobson Company.

EXAMPLES 1–4

Four abrasive compositions according to the present invention were prepared by dissolving nickel sulfamate [Ni(NH$_2$SO$_3$)$_2$.4H$_2$O] in an aqueous slurry of 5% by weight alumina (α-Al$_2$O$_3$) abrasive having an average particle size of 1.4 μm, the amounts of the nickel sulfamate being 10%, 5%, 1.0% and 0.5% by weight, respectively, followed by adding sulfamic acid to adjust the pH of the compositions to 5.3.

Using these abrasive compositions, the polishing tests of the nickel-phosphine plated aluminum-based discs were carried out.

The results of the tests are shown in Table 1.

EXAMPLES 5 and 6

An abrasive composition according to the present invention was prepared by dissolving 4.2% by weight of nickel sulfamate in an aqueous slurry of 20% by weight alumina (α-Al$_2$O$_3$) abrasive having an average particle size of 1.4 μm, followed by adding sulfamic acid to adjust the pH of the slurry to 5.3. This abrasive composition was diluted about 4 and 8 times with water to obtain abrasive compositions having 1.0% and 0.5% by weight of nickel sulfamate.

Using these diluted abrasive compositions, the polishing tests of the nickel-phosphine-plated aluminum-based discs were carried out.

The results are shown in Table 1.

EXAMPLES 7 and 8 (comparative)

Using the same procedures as described in Example 1, conventional abrasive compositions were prepared, but 1.0% and 0.5% by weight of nickel sulfate were added instead of nickel sulfamate.

Using these conventional abrasive compositions, the polishing tests of the nickel-phosphine plated aluminum-based discs were carried out.

The results are shown in Table 1.

TABLE 1

| Example | Concentration of accelerator (wt %) | | Polishing rate (μm/min) | Surface roughness Rtm (Å) |
|---|---|---|---|---|
| 1 | Nickel sulfamate | 10 | 0.86 | 126 |
| 2 | " | 5 | 0.85 | 126 |
| 3 | " | 1.0 | 0.83 | 131 |
| 4 | " | 0.5 | 0.79 | 133 |
| 5 | " | 1.0 | 0.83 | 131 |
| 6 | " | 0.5 | 0.79 | 133 |
| 7* | Nickel sulfate | 1.0 | 0.81 | 142 |
| 8* | " | 0.5 | 0.77 | 138 |

*Comparative Example using nickel sulfate

As shown in Table 1, the polishing rates obtained from the abrasive compositions comprising nickel sulfamate were equivalent to or higher than those of the conventional abrasive compositions comprising nickel sulfate, and the surface roughness of the former was smaller than that of the latter. Note, the polishing characteristics of the compositions having the concentrations of nickel sulfamate of 10% and 5% by weight are not remarkably different, which suggests that not more than 10% by weight of nickel sulfamate is preferable. At 0.5% by weight of nickel sulfamate, the polishing rate was reduced and the surface roughness was high in comparison with those at 1.0% by weight of nickel sulfamate and the number of scratches observed was increased, which suggests that not less than 0.5% by weight of nickel sulfamate is preferable.

Further, according to observation of the polished surfaces with the differential interference microscope, the number of scratches as well as the width and depth thereof were reduced, demonstrating a good finish in Examples 1 to 6 In contrast, in Examples 7 and 8, the number of scratches was larger and the width and depth were also larger, showing an inferior finish.

EXAMPLE 9

Using the same abrasive composition as prepared in Example 3, the polishing test of a substrate of anodized aluminum, more specifically chromate anodized aluminum, was carried out.

The results are shown in Table 2.

EXAMPLE 10 (comparative)

Using the same abrasive composition as prepared in Example 7, the polishing test of the same substrate of anodized aluminum as in Example 9 was carried out.

The results are shown in Table 2.

TABLE 2

| Example | Concentration of accelerator (wt %) | | Polishing rate (μm/min) | Surface roughness Rtm (Å) |
|---|---|---|---|---|
| 9 | Nickel sulfamate | 1.0 | 0.44 | 161 |
| 10* | Nickel sulfate | 1.0 | 0.39 | 182 |

In Table 2, the polishing rate of an anodized substrate is about half that of nickel-plated substrate, since the former is harder than the latter. But, also in the case of the anodized substrate, an abrasive composition containing nickel sulfamate of the present invention obtained a higher polishing rate and a smaller surface roughness in comparison with a conventional abrasive composition containing nickel sulfate.

Thus, the abrasive composition, according to the present invention has the following advantages, when compared with an abrasive composition using nickel sulfate as an etchant:

(i) Increased polishing rate;
(ii) Substantially no deep scratching;
(iii) Lower surface roughness;
(iv) Uniform high grade surface;
(v) Less corrosive to machinery;
(vi) Less harmful to the human body.

We claim:

1. A process for polishing a workpiece with an abrasive composition comprising polishing a surface of the workpiece with an aluminous abrasive, nickel sulfamate, and water.

2. A composition according to claim 1, wherein the nickel sulfamate is present in an amount of 0.5–10% by weight of the total weight of the composition.

3. A composition according to claim 1, wherein the composition has a pH of 4 to 7.

4. A composition according to claim 1, wherein the aluminous abrasive is present in an amount of 1 to 25% by weight of the total weight of the composition.

5. A composition according to claim 1, wherein the aluminous abrasive has an average particle size of 0.5–10 $\mu$m.

6. A composition according to claim 1, for polishing an aluminum-based magnetic-recording-disc substrate, wherein the nickel sulfamate is present in amounts of 0.5–10% by weight of the total weight of the composition, the composition having a pH of 4 to 7, the aluminous abrasive has an average particle size of 0.5 to 10 $\mu$m and is present in an amount of 1 to 25% by weight of the total weight of the composition.

7. A process for polishing a workpiece with an abrasive composition comprising an aluminous abrasive, nickel sulfamate, and water.

8. A process according to claim 7, wherein the workpiece is a substrate for a magnetic recording disc, made of one of aluminum and an aluminum alloy.

9. A process according to claim 8, wherein the substrate is plated with nickel-phosphine.

10. A process according to claim 8, wherein the substrate is anodized.

11. A process according to claim 8, wherein the nickel sulfamate is present in an amount of 0.5 to 10% by weight of the total weight of the composition, the composition having a pH of 4 to 10.

12. A process according to claim 8, wherein the aluminous abrasive has an average particle size of 0.5 to 10 $\mu$m and is present in an amount of 1 to 25% by weight of the total weight of the composition.

* * * * *